May 24, 1949.  W. H. FARR  2,471,388
PLOWSHARE

Filed Feb. 5, 1946  2 Sheets-Sheet 1

INVENTOR
Warren H. Farr

BY
*ATTORNEY*

May 24, 1949.  W. H. FARR  2,471,388
PLOWSHARE

Filed Feb. 5, 1946  2 Sheets-Sheet 2

INVENTOR
Warren H. Farr

BY
ATTORNEY

Patented May 24, 1949

2,471,388

UNITED STATES PATENT OFFICE 2,471,388

PLOWSHARE

Warren H. Farr, Grosse Pointe Farms, Mich., assignor to The Budd Company, Philadelphia, Pa., a corporation of Pennsylvania Application February 5, 1946, Serial No. 645,542

3 Claims. (Cl. 97—113)

This invention relates to plow shares and other members where rear fastenings are desirable and has for an object the provision of an improved rear or blind fastening for plow members and an improved method of making the same.

Commonly plow shares and other detachable members of a plow bottom are attached to the supporting member by bolts having conical heads which are fitted in countersunk holes so that the top surface of the bolt head lies flush with the working surface of the plow member. It is intended that the bolt head and hardened wear surface of the plow member will wear evenly so as always to present a smooth surface to the earth, because even a slight irregularity can start caking of earth on the working face with consequent improper action of the plow. It is difficult to prevent this unequal wear, because it is almost impossible to harden the plow wear surfaces and the bolt head surfaces to the same degree.

There have been some proposals for making blind fastenings for plow members, but these usually have involved hooks or edge slots, welded-on studs, and other constructions which were rather complex in nature and not too dependable in service.

The present invention provides a very simple and efficient rear or blind fastening for plow members or the like, and a very simple and economical method of making the fastening.

The invention will be best understood from consideration of an exemplary embodiment, reference being made to the accompanying drawings thereof, wherein.

Figure 1:
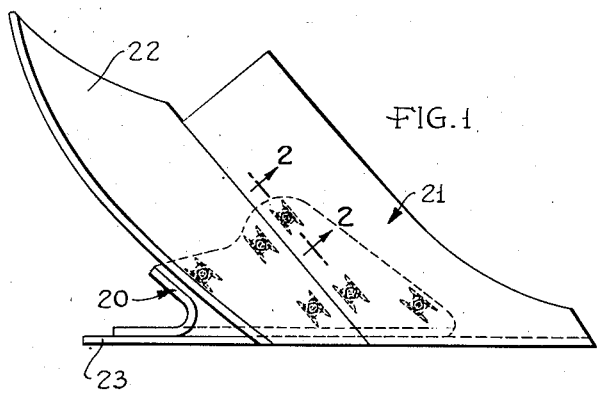
Fig. 1 is a front view of a plow bottom in which the share, landside and moldboard are all secured to the base or stock by fastenings embodying the present invention.
Figure 3:
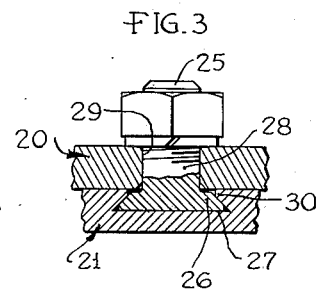
Fig. 3 is a section at right angles to the section of Fig. 2, the section being taken on the line 3—3 of Fig. 2.
Figure 2:
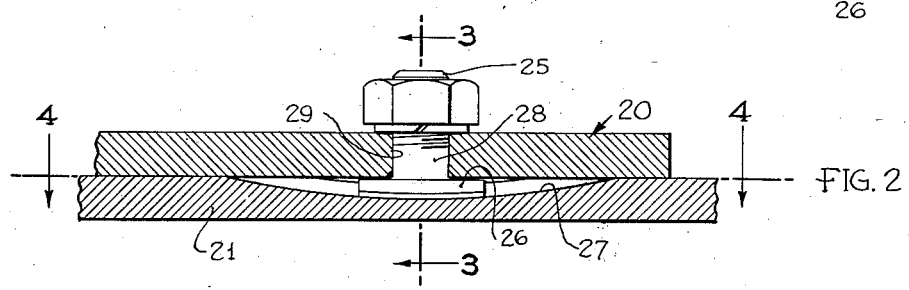
Fig. 2 is an enlarged transverse section through one of the fastenings, the section being taken on the line 2—2 of Fig. 1.
Figure 4:
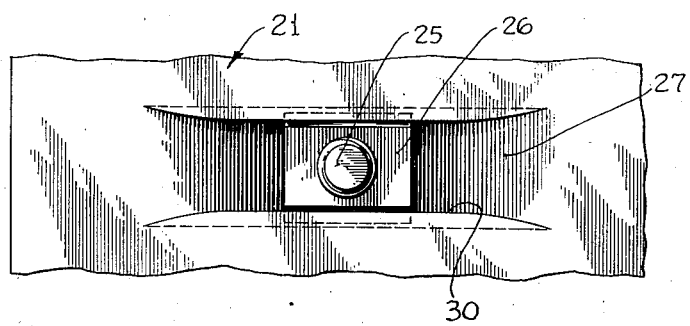
Fig. 4 is a plan view on the line 4—4 of Fig. 2.
Figure 5:
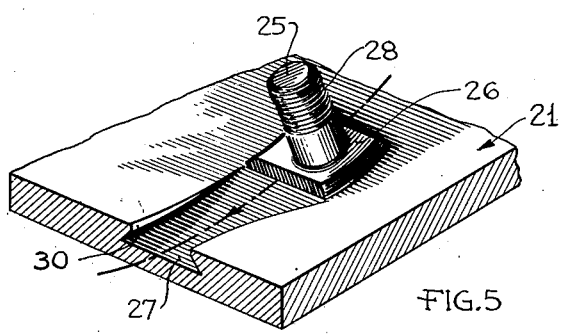
Fig. 5 is a section and perspective showing the bolt separated from the member which it secures.

Referring to the drawings, the plow comprises a supporting member 20 to which are bolted a share 21, a moldboard 22, and a landside 23. The share, moldboard and landside may be referred to as the plow members proper. All of the plow members are secured to the supporting member by bolts 25.

The heads 26 of the bolts are first slipped into the undercut slots 27 in the backs of the plow members, and their shanks 28 are passed through the holes 29 in the supporting member. The slots allow some adjustment of the bolts for entering the holes, this being helpful when a bolt is on a curved part, or when more than one bolt is on a curved part and their axes of securement are not parallel. If the slots are aligned with the direction of greatest curvature, the maximum adjustment of the bolt is permitted.

The slots 27 are arcuate in longitudinal section, being of greatest depth at the center. Here the overhanging side edges 30 are deepest and strongest. The slot, even at the deepest portion, stands fully clear of the hardened front face of the plow member, and is not exposed at the front for any expected amount of wear on the face. Nevertheless, the slot edges are strong enough, particularly in forged steel parts, to take any strain which is expected in use.

The head of the bolt is curved in one direction to fit the curvature of the slot, and is quite long in this direction to spread the load over a large area.

Figure 6:
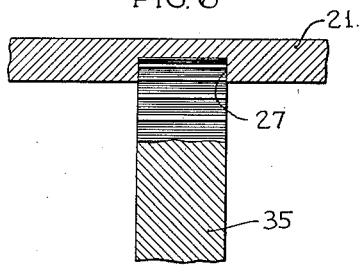
Figs. 6 and 7 show from end and side the first stage of forming the slot.
Figure 7:
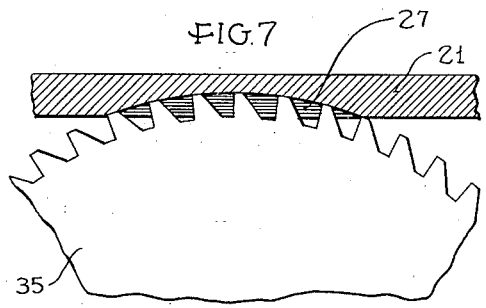

Figs. 6 and 7 show how the slot, except for the undercut edges, may be formed by a cylindrical milling cutter 35.

Figure 8:
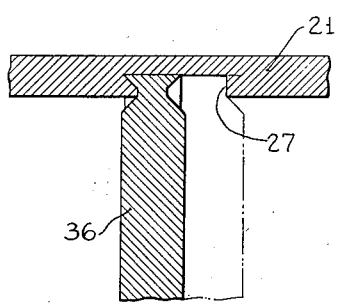
Figs. 8 and 9 are similar views showing the final stage of forming the slot.
Figure 9:
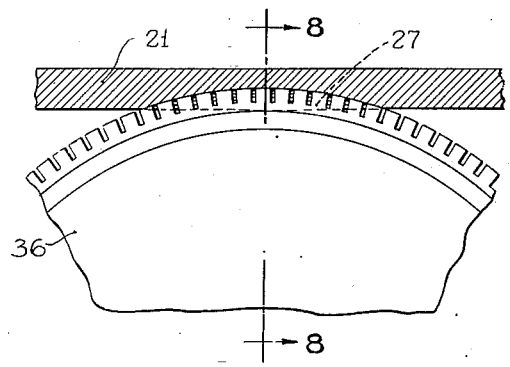

Figs. 8 and 9 show how a side-bevelled milling cutter 36 may be used to finish the slot by being first adjusted to the bottom of the slot, and then moved first to one side and then to the other so its side cutting elements may form the undercut slot sides.

While one embodiment of the invention has been illustrated and described, it is to be understood that there may be various embodiments within the limits of the prior art and the scope of the subjoined claims.

What is claimed is:

1. In a plow in combination, a supporting member having therein a hole for a bolt, a plow member having a hardened front wear face and an arcuate undercut slot on the rear side, the slot being deepest at its mid-length and sloping up to zero depth at each end and a bevelled head bolt fitting in the slot and passing through the hole for securing the plow member to the supporting member.

2. In a plow in combination, a first member having therein a hole for a bolt, a second member having a surface adapted to lie against a surface of said first member, said second member having an elongated undercut slot along its surface with an open end at the surface and a deep portion at a distance from the end, the slot being of graduated depth from the open end to the deep portion, and a bolt having a head adapted to enter the open end of the slot and move therealong to the deep portion, and the bolt having a shank adapted to pass through the hole in the first said member when the head is in the deep portion of the slot in the second member.

3. In a plow in combination, a first member having therein a hole for a bolt, a second member having a surface adapted to lie against a surface of said first member, said second member having an elongated undercut slot along its surface with an open end at the surface and a deep portion at a distance from the end, the slot being of graduated depth from the open end to the deep portion, and a bolt having a head adapted to enter the open end of the slot and move therealong to the deep portion, and the bolt having a shank adapted to pass through the hole in the first said member when the head is in the deep portion of the slot in the second member, the said second member having a soft portion on the side on which said slot is formed and a hardened wear face portion on the opposite side.

WARREN H. FARR.

REFERENCES CITED

The following references are of record in the file of this patent:

UNITED STATES PATENTS

| Number | Name | Date |
|---|---|---|
| 169,716 | McCune | Nov. 9, 1875 |
| 264,885 | Kellogg | Sept. 26, 1882 |
| 321,187 | Casaday | June 30, 1885 |
| 928,690 | Paul | July 20, 1909 |
| 1,088,105 | Sharp | Feb. 24, 1914 |
| 1,250,962 | Buchanan | Dec. 25, 1917 |
| 1,447,883 | Peterson | Mar. 6, 1923 |
| 2,312,371 | Strandlund | Mar. 2, 1943 |
| 2,323,177 | Baker | June 29, 1943 |
| 2,397,086 | Brady | Mar. 26, 1946 |